US012730756B2

(12) United States Patent
Gupta et al.

(10) Patent No.: US 12,730,756 B2
(45) Date of Patent: Sep. 8, 2026

(54) MAINTAINING LIMITS ON MODIFIED METADATA TRACKS

(71) Applicant: INTERNATIONAL BUSINESS MACHINES CORPORATION, Armonk, NY (US)

(72) Inventors: Lokesh Mohan Gupta, Tucson, AZ (US); Kevin J. Ash, Tucson, AZ (US); Kyler A. Anderson, Sahuarita, AZ (US); Brian Anthony Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 18/925,825

(22) Filed: Oct. 24, 2024

(65) Prior Publication Data

US 2026/0119406 A1 Apr. 30, 2026

(51) Int. Cl.

| | |
|---|---|
| ***G06F 12/0871*** | (2016.01) |
| ***G06F 9/30*** | (2018.01) |
| ***G06F 12/0877*** | (2016.01) |

(52) U.S. Cl.
CPC ...... *G06F 12/0871* (2013.01); *G06F 9/30043* (2013.01); *G06F 12/0877* (2013.01)

(58) Field of Classification Search
CPC ............. G06F 12/0871; G06F 9/30043; G06F 12/0877
USPC .......................................................... 711/118
See application file for complete search history.

(56) References Cited

U.S. PATENT DOCUMENTS

| | | | | |
|---|---|---|---|---|
| 7,930,588 | B2 | 4/2011 | Blount et al. | |
| 9,471,505 | B2 | 10/2016 | Ash et al. | |
| 10,970,209 | B2 | 4/2021 | Gupta et al. | |
| 2019/0034303 | A1 * | 1/2019 | Anderson | G06F 12/0842 |
| 2019/0377610 | A1 * | 12/2019 | Gupta | G06F 3/061 |
| 2020/0293447 | A1 * | 9/2020 | Gupta | G06F 12/0868 |

OTHER PUBLICATIONS

Disclosed Without Attribution, IP.com No. IPCOM000221079D, "Method and System for Managing Cache of Copy Service Metadata Initialized After Volume Creation", Aug. 28, 2012, 3 pages.

* cited by examiner

*Primary Examiner* — Jared I Rutz
*Assistant Examiner* — Wei Ma
(74) *Attorney, Agent, or Firm* — Seed Intellectual Property Law Group LLP

(57) ABSTRACT

A method of cache management for a code load is provided. In some embodiments, a method includes receiving a request to load code at a cluster complex. The cluster complex comprises a first node and a second node. The first node includes a first cache and the second node having a second cache. The method comprises, in response to the request, destaging the first cache of the first node and directing input/output requests to the second node. The method comprises, in response to the first cache being destaged, sending the request to the first node. The method comprises executing the request at the first node. The method comprises resuming input/output requests to the first node.

20 Claims, 8 Drawing Sheets

100

MAINTAINING LIMITS ON MODIFIED METADATA TRACKS

BACKGROUND

Computing systems include processors, memories, and non-volatile storage (NVS) such as hard drives. The memory of the computer system usually has faster read and write speeds than the NVS storage. The processors of the computing systems can include memories called cache memories or caches, which are memories that have faster read and write times than the non-cache memory and NVS of the computing system.

BRIEF SUMMARY

Embodiments of the present disclosure relate to metadata management, and more specifically, to maintaining limits on modified metadata tracks.

According to embodiments of the present disclosure, methods and systems of and computer program products for metadata management are provided. In some embodiments, a method includes receiving a request to load code at a cluster complex. The cluster complex comprises a first node and a second node. The first node includes a first cache and the second node having a second cache. The method comprises, in response to the request, destaging the first cache of the first node and directing input/output requests to the second node. The method comprises, in response to the first cache being destaged, sending the request to the first node. The method comprises executing the request at the first node. The method comprises resuming input/output requests to the first node.

In some embodiments, the method further comprises, in response to resuming input/output requests to the first node, destaging the second cache of the second node and directing input/output requests to the first node. The method further comprises in response to the second cache being destaged, sending the request to the second node. The method further comprises executing the request at the second node. The method further comprises resuming input/output requests to the second node.

In some embodiments, first node and the second node are communicatively coupled with one or more ranks. The one or more ranks can being an array of non-volatile storage. Destaging the first cache can further comprise for each rank of the one or more ranks, determining a count of modified metadata tracks stored in one of the first cache, loading a limit of modified metadata tracks per rank, and allocating a metadata track for modification access when the count of modified metadata tracks is less than the limit.

In some embodiments, the method further comprises maintaining a first wait list by rank of metadata tracks for modification access. The method further comprises maintaining a second wait list by rank of metadata tracks for destaging from cache to storage. The method further comprises destaging a metadata track of metadata track from the first cache. The method further comprises, in response to destaging the metadata track, updating the second wait list and the count of modified metadata tracks.

In some embodiments, determining the count of modified metadata tracks further comprises decrementing the count when a metadata track on the rank is destaged from cache to storage and incrementing the count when a metadata track on the rank is staged to cache.

In some embodiments, the method further comprises storing an identifier for each modified metadata track in non-volatile storage.

In some embodiments, the method further comprises determining that a first number of metadata tracks have been destaged for a given rank. The method can further comprise granting, for the given rank, modification access to a second number of metadata tracks on the wait list for modification access, the second number being less the first number.

In some embodiments, allocating a metadata track for modification access further comprises determining, before granting modification access for a metadata track of a rank of the one or more ranks, whether the number of modified metadata tracks on the rank is under the limit, granting modification access for the metadata track if the number of modified metadata tracks on the rank is under the limit, and adding the metadata track to the wait list of the rank for modification access if the number of modified metadata tracks on the rank is not under the limit.

In some embodiments, the method includes skipping, for each rank, processing of the wait list for modification access at a regular interval based on the number of metadata track destages that have been performed.

In some embodiments, a system comprises a cluster complex having a first node and a second node. The first node comprises a first cache and the second node comprises a second caches. The system further comprises a computing node comprising a computer readable storage medium having program instructions embodied therewith, the program instructions executable by a processor of the computing node to cause the processor to perform a method comprising receiving a request to load code at a cluster complex. The method further includes in response to the request, destaging the first cache of the first node and directing input/output requests to the second node. The method further includes in response to the first cache being destaged, sending the request to the first node. The method further includes executing the request at the first node. The method further includes resuming input/output requests to the first node.

In some embodiments, the method executed by the computing node further includes, in response to resuming input/output requests to the first node, destaging the second cache of the second node and directing input/output requests to the first node. The method executed by the computing node further includes in response to the second cache being destaged, sending the request to the second node. The method executed by the computing node further includes executing the request at the second node. The method executed by the computing node further includes resuming input/output requests to the second node.

In some embodiments, the system further includes one or more ranks communicatively coupled with the first node and the second node. The one or more ranks can be an array of non-volatile storage. Destaging the first cache can further include, for each rank of the one or more ranks, determining a count of modified metadata tracks stored in one of the first cache, loading a limit of modified metadata tracks per rank, and allocating a metadata track for modification access when the count of modified metadata tracks is less than the limit.

In some embodiments, determining the count of modified metadata tracks further comprises decrementing the count when a metadata track on the rank is destaged from cache to storage and incrementing the count when a metadata track on the rank is staged to cache.

In some embodiments, the method executed by the computing node further includes storing an identifier for each modified metadata track in non-volatile storage.

In some embodiments, the method executed by the computing node further includes determining that a first number of metadata tracks have been destaged for a given rank, and granting, for the given rank, modification access to a second number of metadata tracks on the wait list for modification access, the second number being less the first number.

In some embodiments, allocating a metadata track for modification access further comprises determining, before granting modification access for a metadata track of a rank of the one or more ranks, whether the number of modified metadata tracks on the rank is under the limit, granting modification access for the metadata track if the number of modified metadata tracks on the rank is under the limit, and adding the metadata track to the wait list of the rank for modification access if the number of modified metadata tracks on the rank is not under the limit.

In some embodiments, the method executed by the computing node further includes skipping, for each rank, processing of the wait list for modification access at a regular interval based on the number of metadata track destages that have been performed.

In some embodiments, a computer program product for maintaining limits on modified metadata tracks can comprise a computer readable storage medium having program instructions embodied therewith. The program instructions can be executable by a processor to cause the processor to perform a method comprising receive a request to load code at a cluster complex, the cluster complex having a first node and a second node, the first node having a first cache and the second node having a second cache. The method can, in response to the request, destaging the first cache of the first node, and directing input/output requests to the second node. The method can, in response to the first cache being destaged, send the request to the first node. The method can executing the request at the first node. The method can resuming input/output requests to the first node.

In some embodiments, the program instructions further cause the processor to perform the method including, in response to resuming input/output requests to the first node, destaging the second cache of the second node and directing input/output requests to the first node. The program instructions can further include, in response to the second cache being destaged, sending the request to the second node. The program instructions can further include executing the request at the second node and resuming input/output requests to the second node.

DETAILED DESCRIPTION

In some computing systems, a code load or a remote code load can update executable code of that computing system. In some embodiments, a code load can be performed to computing systems concurrently with Input/Output (I/O) being performed on those same systems.

Figure 1:
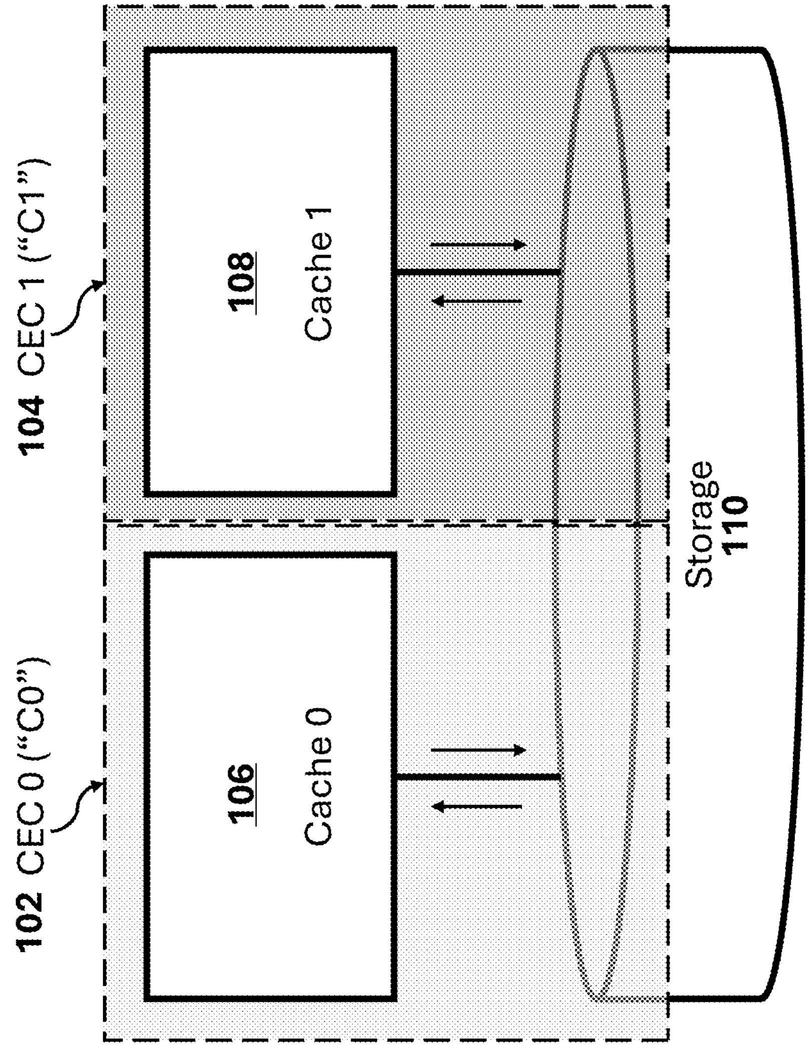
FIG. 1 is a schematic illustrating an example of a system according to embodiments of the present disclosure.

FIG. 1 is a schematic illustrating an example of a system according to embodiments of the present disclosure. In some embodiments, the system can include two Central Electronics Complexes (CECs) 102 and 104, referred to as C0 102 and C1 104, respectively. CECs, also referred to as Central Processor Complexes (CPCs), are a collection of hardware that z/OS® systems run on. CECs provide a number of general purpose processors and specialty processors. The hardware in a CEC is managed by a hypervisor that enables the resources in the CEC to be used to run one or more Logical Partitions.

In some embodiments, C0 can have a cache 106. In some embodiments, C1 can have a cache 108. In some embodiments, the caches of C0 and C1 can each be in communication with a shared storage 110. In some embodiments, a code load on the system requires that the cache 106 or 108 of the respective of its respective CEC 102 or 104 is free of I/O requests that are different from the code load. Therefore, in some embodiments, to perform the code load, one of the caches (C0 102 or C1 102) are destaged in a controlled fashion. For example, to perform a code load on C0 102, Cache 0 106 can be destaged. In some embodiments, ownership of all logical subsystems (e.g., groups of volumes) is switched to C1 108 in turn. In some embodiments, such code loads need to be concurrent to the running of I/O. Therefore, as the code load is being performed on C0 102, I/O can continue with C1 104 via cache 108.

In some embodiments, during code loads, several quiesce/resume steps can be performed to load the code on each CEC:

a. Quiesce C0 102, updated code level on C0 102. Thereby, all I/O is now running on C1 104.
b. Resume C0 102, I/O now running on both CECs C0 102 and C1 104.
c. Quiesce C1 104, update code level on C1 104. All I/O is now running on C0 102.
d. Resume C1 104, I/O now running on both CECs C0 102 and C1 104.

During these quiesce and resume steps, each cache destages all modified data (e.g., writes the modified data to NVS storage 110) until it has a state of zero modified data in its queue (e.g., a state where all the data in cache match the corresponding copies of data in storage) so that a code load can be performed using that cache, while I/O is performed by another CEC. In some embodiments, the modified data can comprise I/O data (e.g., I/O data received from a user or customer) and metadata. However, during the process of destaging modified data for a given cache, I/O can be running, thereby creating more modified data for the caches. As a result, getting to zero modified data in cache can take a long time, especially for modified metadata tracks.

In some embodiments of the present disclosure, a method of improved time efficiency for code loads concurrent with the running of I/O is provided.

In some embodiments, destaging includes writing a modified track in a cache to disk/non-volatile storage. In some embodiments, destaging includes writing a modified track to a non-cache volatile memory. After a destage is complete, the track can be marked as unmodified in cache, since the track in cache matches the copy on disk/non-volatile storage.

In some embodiments, staging includes reading a metadata track from disk/non-volatile storage to cache or a non-cache volatile memory. When a staging operation is complete, the track is marked as unmodified at that point because it matches the copy on disk/non-volatile storage. Staging a track does, however, grant access for modifying the track. Once the track is modified in the cache, it can be marked as modified.

In some embodiments, when a metadata track is updated and becomes modified for the first time, a corresponding track ID can be added to a track ID list stored in non-volatile storage (NVS). When a metadata track is destaged and becomes unmodified, the corresponding track ID can be removed from the NVS track ID list.

In some embodiments, the NVS track ID list can include all modified metadata tracks.

In some embodiments, the NVS track ID list can only include modified metadata tracks.

In some embodiments, NVS can receive the destaged metadata track when metadata is updated and becomes modified. In some embodiments, instead of storing the entire metadata track on the NVS, the ID of the metadata track can be stored in NVS. This storage strategy is different from that used in some embodiments for modified customer data—in some embodiments, full copies of modified customer data can be stored in NVS. Metadata can be recovered (e.g., in the case of a failover, reboot, or power off) by performing recovery operations with other caches and hence the entire metadata track does not need to be stored in NVS. The metadata track IDs stored in NVS can reveal which metadata tracks to recover.

In some embodiments, staging a metadata track can be performed for the purpose of reading or updating the metadata track. While a read of the metadata track does not mark the track as modified, an update of the metadata track does cause the track to be marked as modified. When a metadata track is updated, a corresponding NVS track ID can be stored in NVS.

Figure 2:
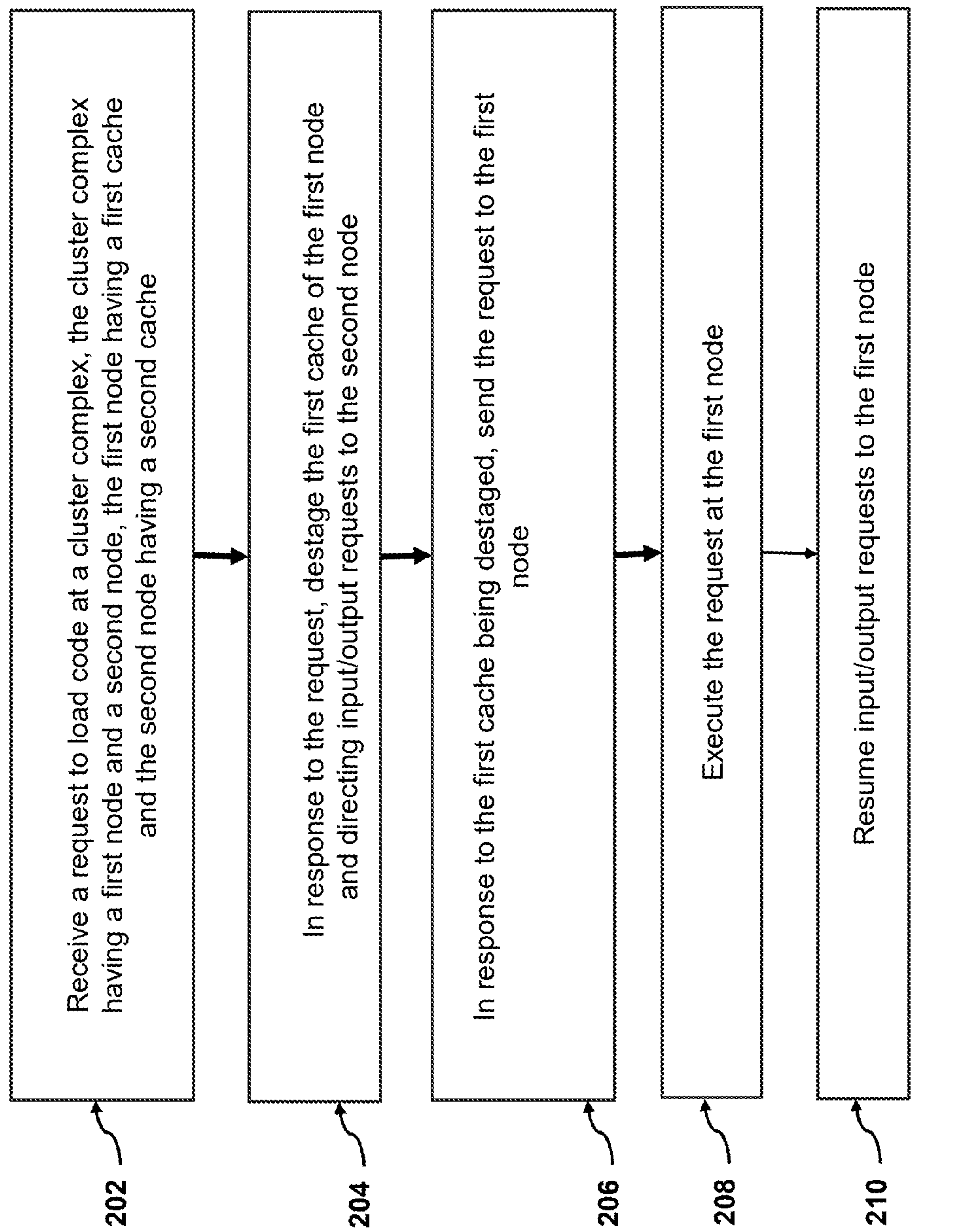
FIG. 2 is a flowchart illustrating a method according to embodiments of the present disclosure.

FIG. 2 is a flowchart 200 illustrating a method according to embodiments of the present disclosure. In some embodiments, a rank can be an array of NVS storage, such as a Redundant Array of Independent Disks (RAID array). The method can receive a request to load code at a cluster complex (202. The cluster complex can have a first node and a second node. The first node can have a first cache and the second node having a second cache. The method can, in response to the request, destage the first cache of the first node and directing input/output requests to the second node (204). Destaging the first cache can include destaging all tracks of the cache to non-volatile storage or another cache. The method can then, in response to the first cache being destaged, send the request for the code load to the first node (206). The method can then, execute the request at the first node (208). The method can then resume input/output requests to the first node once the execution of the request is complete (210). In this way, the first cache is emptied of all tracks and other I/O is paused so that the code load can be send uninterrupted to that node and its cache, and the code can be upgraded at the node. Once the code is upgraded, the node can resume (e.g., Quiesce) normal cache and I/O operations.

In some embodiments, at 202, a count of modified metadata tracks can be maintained for each of one or more ranks storing metadata tracks. In some embodiments, at 204, a limit on the number of modified metadata tracks per rank can be implemented. In some embodiments, at 206, a wait list by rank of metadata tracks for modification access can be maintained. In some embodiments, the wait list for modification access for each rank can be a first-in-first-out (FIFO) wait list. In some embodiments, at 208, a wait list by rank of metadata tracks for destaging from cache to storage can be maintained. In some embodiments, the wait list for destaging for each rank can be a Least Recently Used (LRU) list of metadata tracks.

Figure 3:
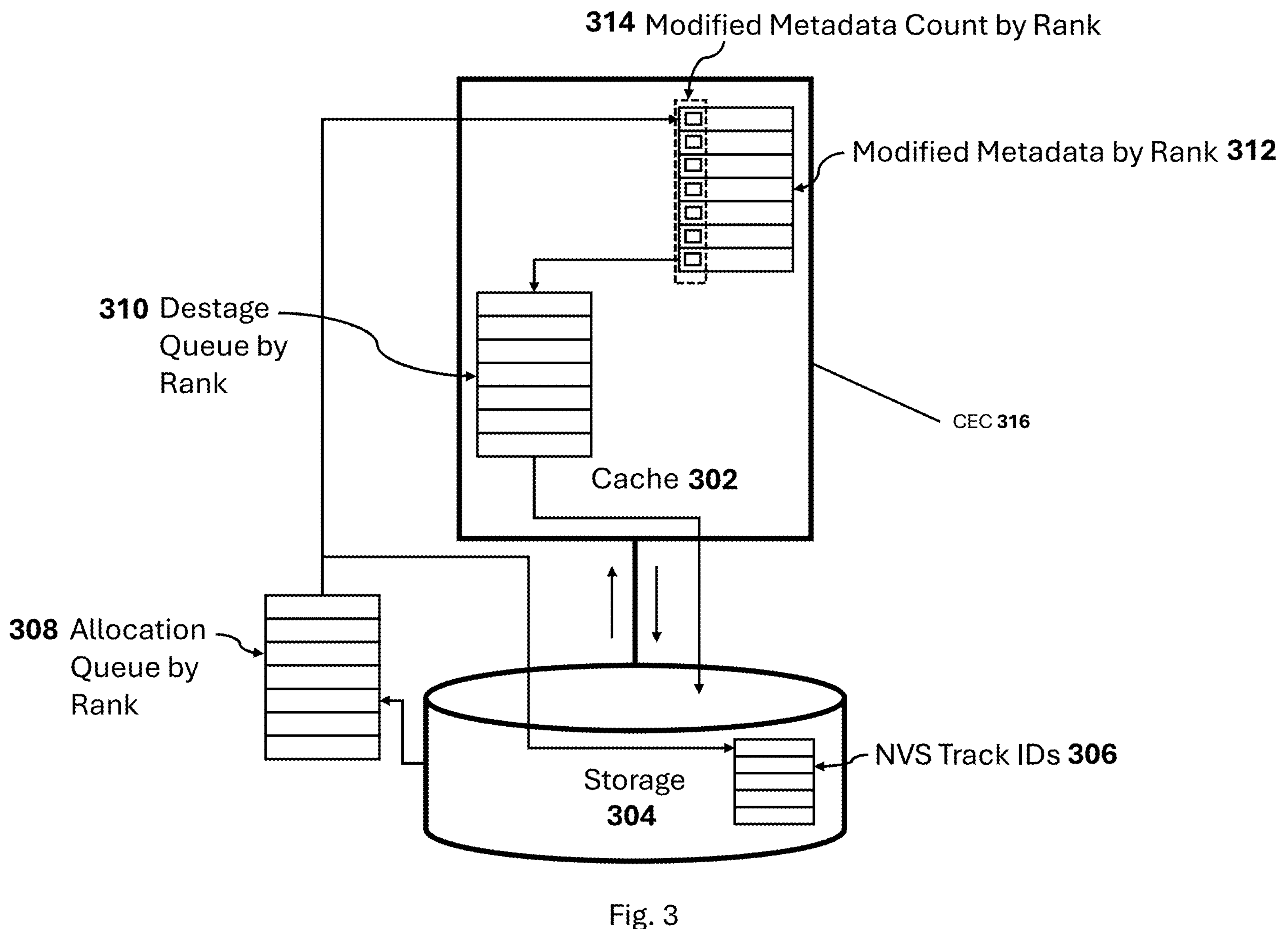
FIG. 3 is a schematic illustrating a cache/storage hardware setup according to embodiments of the present disclosure.

FIG. 3 is a schematic 300 illustrating a CEC 316 according to embodiments of the present disclosure. In some embodiments, the CEC 316 a cache 302 can be communicatively coupled with a non-volatile storage (NVS) 304. For example, the NVS 304 can be a hard drive, a solid state drive, an enterprise disk or other long term storage disk. In some embodiments, a list of track identifiers (IDs) 306 for modified metadata tracks can be stored by the storage 304. In some embodiments, the metadata track IDs can be held in storage/NVS for the purpose of recovering metadata in the case of a failover, reboot, or power off. In some embodiments, a metadata track is staged, or copied from storage/NVS 304 to cache 302, before the track can be modified. In some embodiments, a queue 308 of metadata tracks to be allocated to the cache 302 (e.g., tracks waiting for modification access) can be maintained. In some embodiments, a separate queue of metadata tracks waiting for modification access can be maintained for each rank. In some embodiments, one or more modified metadata tracks 312 can be held in the cache 302. In some embodiments, a count 314 of modified metadata tracks for each rank can be maintained. In some embodiments, a queue 310 of NVS track IDs for modified metadata tracks waiting to be destaged, or written to storage/NVS, can be maintained.

Figure 4:
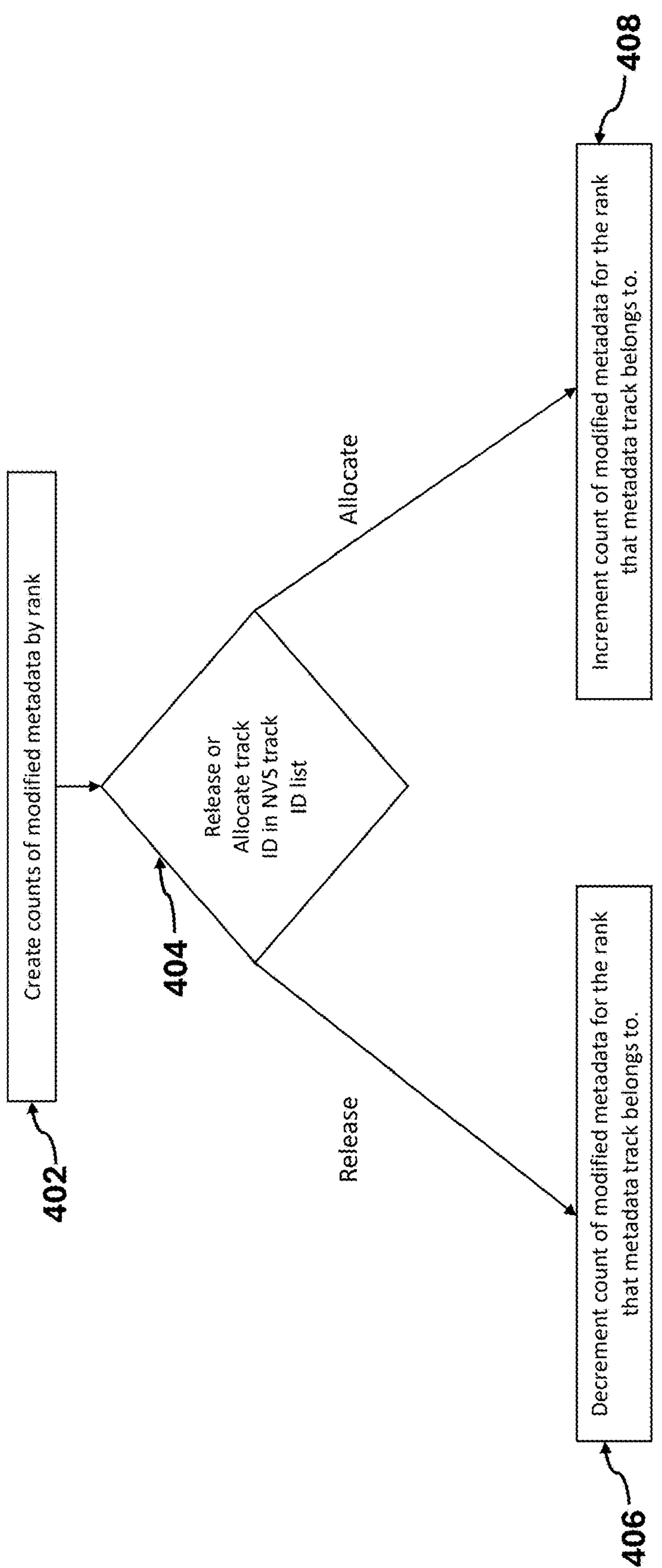
FIG. 4 is a flowchart illustrating a method of maintaining counts of modified metadata tracks by rank, according to embodiments of the present disclosure.

FIG. 4 is a flowchart 400 illustrating a method of maintaining counts of modified metadata tracks by rank, according to embodiments of the present disclosure. In some embodiments, at 402, counts of modified metadata by rank can be created. In some embodiments, at 404, a metadata track can be either released/destaged (e.g., written to storage/NVS), or allocated/staged (e.g., given an NVS track ID and copied from storage/NVS to cache). In some embodiments, at 406, when the metadata track is destaged/released, the method can decrement the count of modified metadata for the rank that the destaged/released metadata track belongs. In some embodiments, at 408, when the metadata track is staged/allocated, the method increment in the count of modified metadata for the rank that the staged/allocated metadata track belongs.

Figure 5:
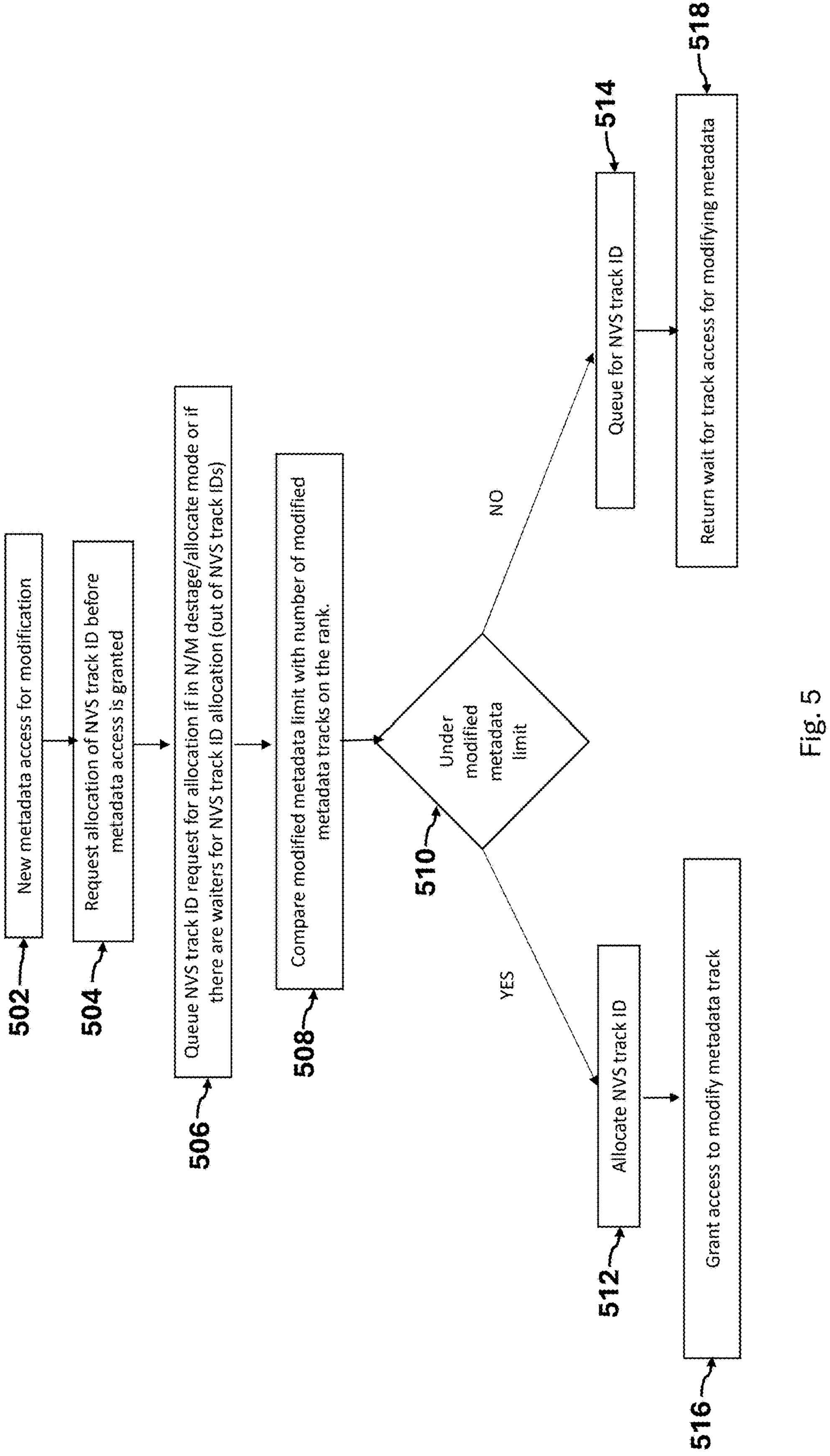
FIG. 5 is a flowchart illustrating a method of maintaining a limit on the number of modified metadata tracks per rank, according to embodiments of the present disclosure.

FIG. 5 is a flowchart 500 illustrating a method of maintaining a limit on the number of modified metadata tracks per rank, according to embodiments of the present disclosure. In some embodiments, the method can be employed when there is a limit set on a number of tracks to be stored in the cache and that limit is less than the number of tracks already stored in the cache. As an example, the method can be employed when the cache is storing three million tracks and a limit of storing 2.5 million tracks is imposed.

In some embodiments, at 502, access for modifying a metadata track can be requested by an I/O request. In some embodiments, at 504, allocation of an NVS track ID for the metadata track can be requested in response to the request for metadata access. In some embodiments, at 506, the method determines whether a number N destages have been performed, and if so, allows M allocations if so. In some embodiments, M is a number less than N (e.g., M<N) and can be any of N−C, where C is a constant, N*C, where C is between 0 and 1 (e.g., a percentage), or N−1. In some embodiments, at 506, the NVS track ID request for allocation can be queued at the cache when in an N/M destage/allocate mode or if there are waiters for NVS track ID allocation. When a N destages have been performed, the method allows M allocations of NVS track IDs to be queued. In some embodiments, at 506, when there is at least one metadata track in the wait list/queue for NVS track ID allocation, the NVS track ID allocation request can be queued. In some embodiments, at 508, a designated limit on the number of modified metadata tracks per rank can be compared to the actual number of modified metadata tracks on the rank of the track for which modification access has been requested. When the number of modified metadata tracks on the rank is under the modified metadata limit (510), at 512, the track for which modification access was requested can be allocated an NVS track ID. In some embodiments, at 516, access to modify the metadata track can be granted after the track has been allocated an NVS track ID. When the number of modified metadata track son the rank is over the modified metadata limit (510), the metadata track for which modification access was requested can be queued for NVS track ID allocation. In some embodiments, at 518, a message to wait for modification access to the metadata track (which has been queued for NVS track ID allocation) can be returned.

Figure 6:
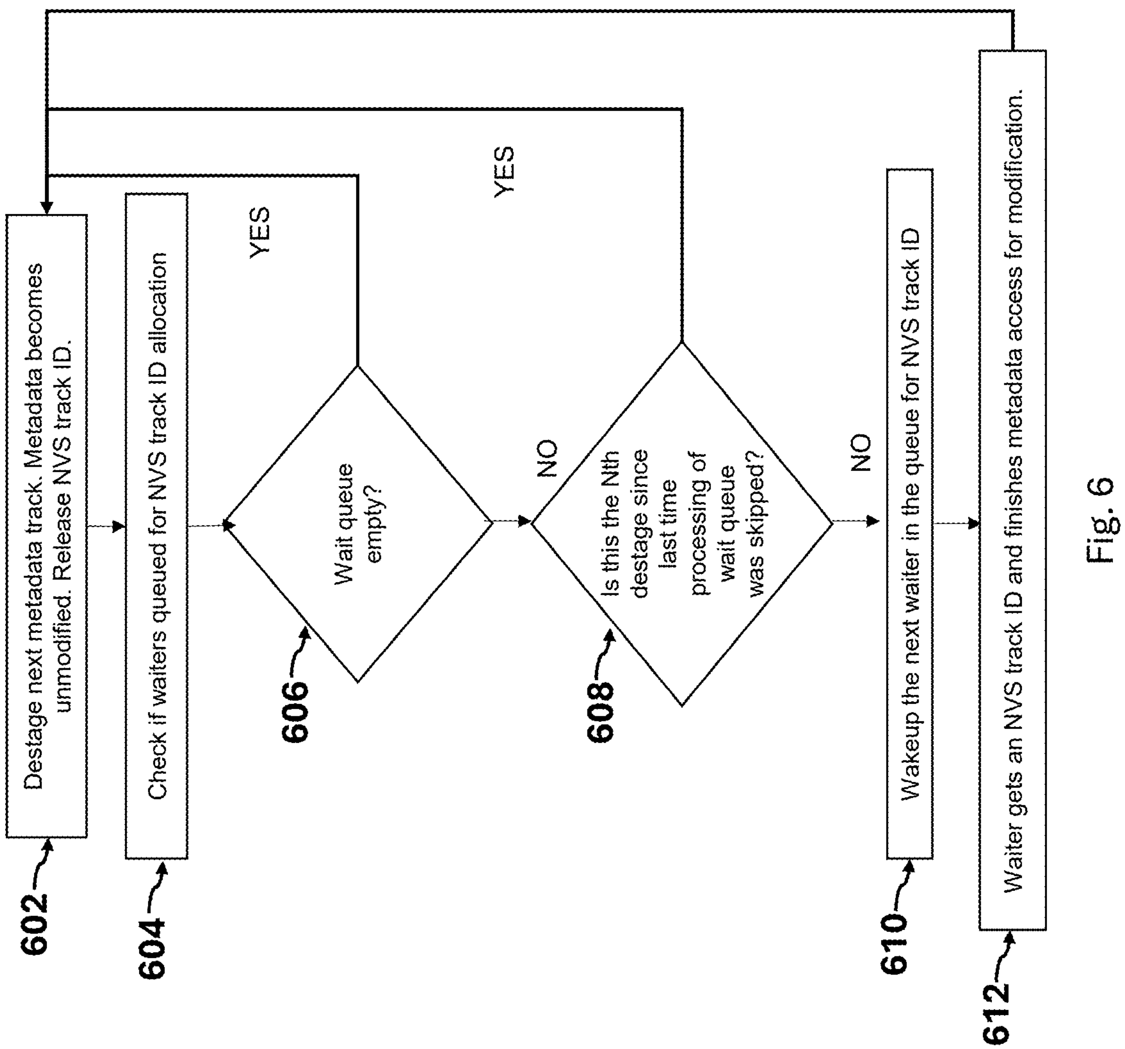
FIG. 6 is a flowchart illustrating a method of destaging/releasing metadata tracks with attention to a queue/wait list of metadata tracks for modification access, according to embodiments of the present disclosure.

FIG. 6 is a flowchart 600 illustrating a method of destaging/releasing metadata tracks from a queue/wait list of metadata tracks for modification access, according to embodiments of the present disclosure. In some embodiments, at 602, a next metadata track of a destage queue can be destaged. Once the track is destaged, the metadata track can is marked as unmodified and the corresponding NVS track ID can be released. In some embodiments, at 604, a queue of metadata tracks for NVS ID allocation can be checked to determine if there are any waiters queued. In some embodiments, at 606, if the allocation queue is determined to be empty, the next metadata track on the destage queue can be destaged at step 202. In some embodiments, at 608, if the allocation queue is determined to have at least one waiter (e.g., not empty), the number of destages since the last time processing of the allocation queue was skipped can be determined. If the determined number of destages is exceeds the threshold to a designated number M (or, in the scenario where M is N−1, equals or exceeds N itself), processing of the allocation queue can be skipped and the next metadata track on the destage queue can be destaged. In some embodiments, at 610, if the determined number of destages is less than to the threshold M, the next metadata track in the allocation queue can be woken up (e.g., popped from the queue for destaging). In some embodiments, at 612, the woken-up queued metadata track can be assigned an NVS track ID and access for modifying the metadata track can be granted, and that track can be destaged in step 602. A person of ordinary skill in the art can recognize that the method of FIG. 6 can continue to iterate.

Figure 7:
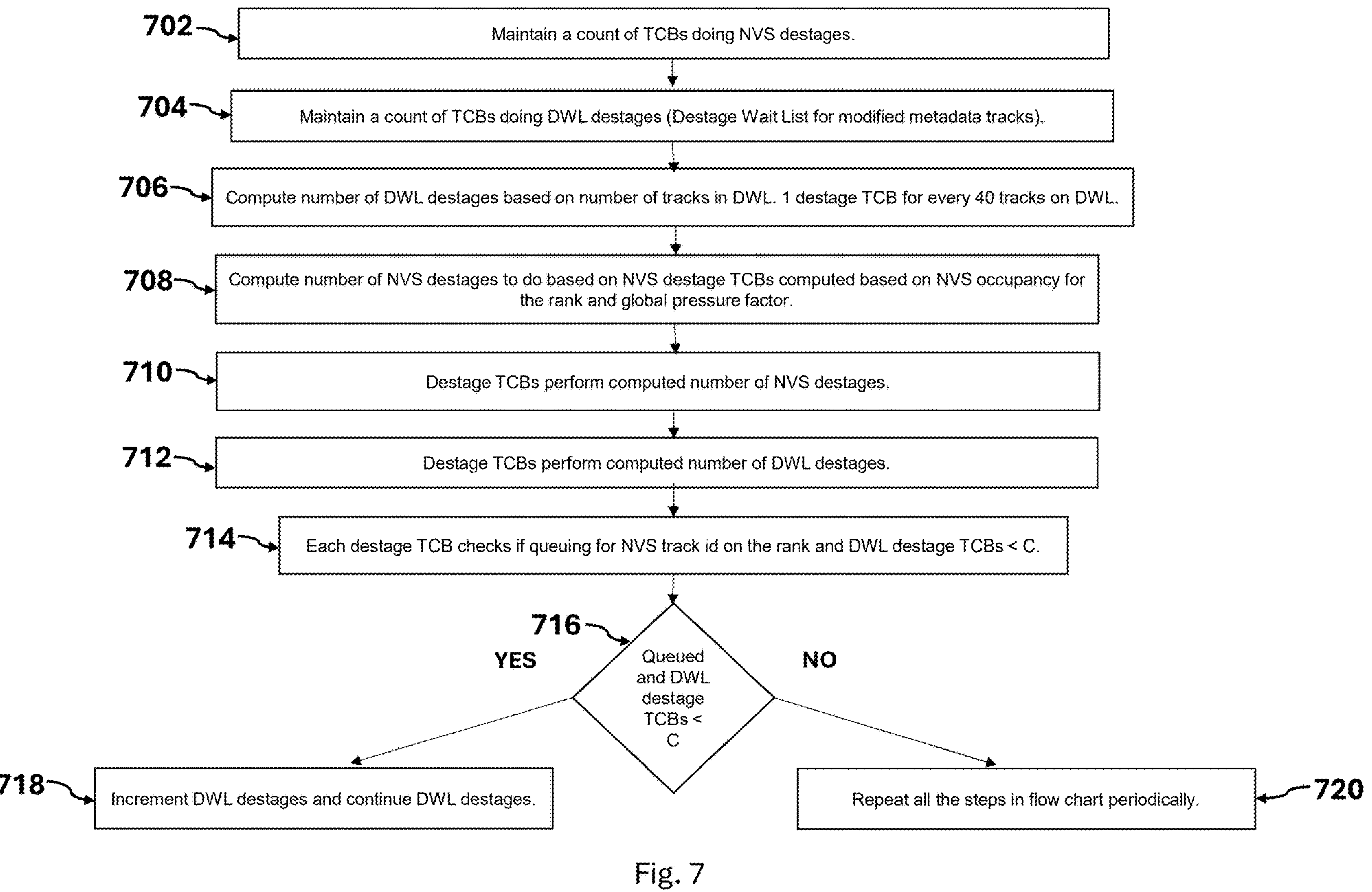
FIG. 7 is a flowchart illustrating a method of managing metadata track destages according to embodiments of the present disclosure.

FIG. 7 is a flowchart 700 illustrating a method of managing metadata track destages according to embodiments of the present disclosure. In some embodiments, at 702, a count of task control blocks (TCBs) (e.g., threads in other operating systems) performing NVS destages can be maintained. In some embodiments, an NVS destage can modify a metadata track. In some embodiments, at 704, a count of TCBs performing destages for a Destage Wait List (DWL), (e.g., a queue of modified metadata tracks for destaging) can be maintained. In some embodiments, at 706, a number of DWL destages to do can be computed based on the number of tracks in the DWL. For example, this computation can be performed by 1 destage TCB can be performed for every 40 DWL entries, however, other rations of destaging TCB per DWL entries can be performed, and the method is not limited to 1 destage TCB for every 40 DWL entry. In some embodiments, at 708, the method computes a number of NVS destages (e.g., destages from NVS) to be performed based on a computed number of NVS destage TCBs. In some embodiments, the number of NVS destage TCBs can be computed based on NVS occupancy for the rank and/or a global pressure factor. In one non-limiting example, the number of NVS destages to be performed can be computed by allocating 5 NVS destages for every NVS destage TCB, however, other numbers of the NVS stages to be performed for each NVS destage TCB can be employed. In some embodiments, at 710, the destage TCBs can perform the computed number of NVS destages. In some embodiments, at 712, the destage TCBs can perform the computed number of DWL destages. In some embodiments, at 714 and 716, each destage TCB can check if there is a nonempty queue for NVS track ID allocation on the rank and if the number of DWL destage TCBs is less than a constant (e.g., less than 2). In some embodiments, at 718, when there is a nonempty queue for NVS track ID allocation on the rank and the number of DWL destages TCBs is less than the constant (716), the number of DWL destages to do can be incremented and the DWL destages can be continued. In some embodiments, at 720, when there is no queue for NVS track ID allocation on the rank, or if the number of DWL destage TCBs is not less than the constant, the steps of FIG. 7 can be iterated.

Figure 8:
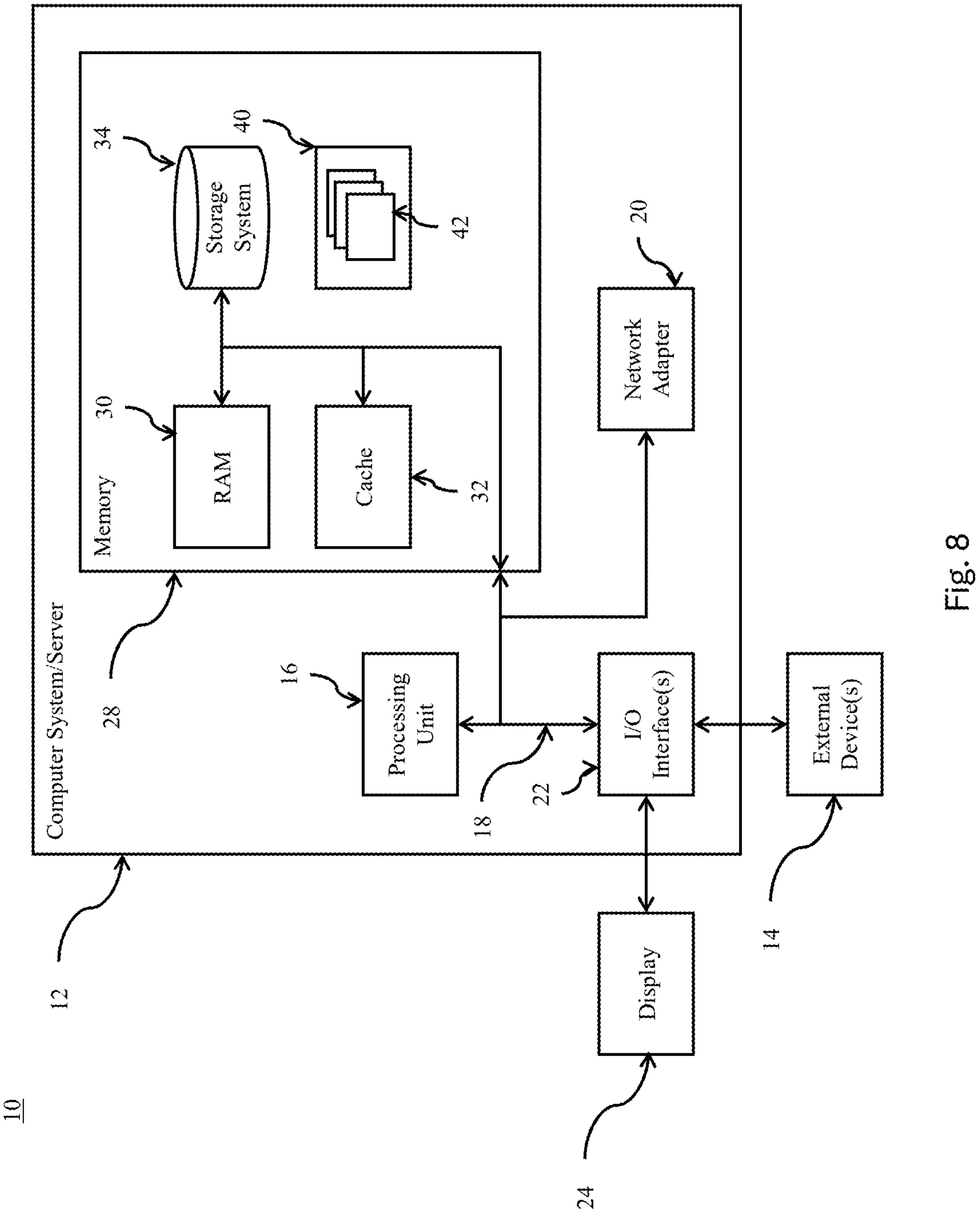
FIG. 8 is a schematic illustrating an example of a computing node according to embodiments of the present disclosure.

FIG. 8 is a schematic illustrating an example of a computing node according to embodiments of the present disclosure. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving a request to load code at a cluster complex, the cluster complex having a first node and a second node, the first node having a first cache and the second node having a second cache;

in response to the request:

destaging the first cache of the first node and detecting that the first cache has reached a state of zero modified data; and directing input/output requests to the second node;

in response to the first cache being destaged, sending the request to the first node;

executing the request at the first node; and resuming input/output requests to the first node.

2. The method of claim 1, further comprising:

in response to resuming input/output requests to the first node:

destaging the second cache of the second node and detecting that the second cache has reached the state of zero modified data; and directing input/output requests to the first node;

in response to the second cache being destaged, sending the request to the second node;

executing the request at the second node; and resuming input/output requests to the second node.

3. The method of claim 1, wherein the first node and the second node are communicatively coupled with one or more ranks, the one or more ranks being an array of non-volatile storage, and wherein destaging the first cache further includes:

for each rank of the one or more ranks, determine a count of modified metadata tracks stored in one of the first cache;

loading a limit of modified metadata tracks per rank; and allocating a metadata track for modification access when the count of modified metadata tracks is less than the limit.

4. The method of claim 3, further comprising:

maintaining a first wait list by rank of metadata tracks for modification access;

maintaining a second wait list by rank of metadata tracks for destaging from cache to storage;

destaging a metadata track from the first cache; and in response to destaging the metadata track, updating the second wait list and the count of modified metadata tracks.

5. The method of claim 4, wherein allocating the metadata track for modification access further comprises:

determining, before granting modification access for a metadata track of a rank of the one or more ranks, whether a number of modified metadata tracks on the rank is under the limit;

granting modification access for the metadata track if the number of modified metadata tracks on the rank is under the limit; and adding the metadata track to the first wait list of the rank for modification access if the number of modified metadata tracks on the rank is not under the limit.

6. The method of claim 4, further comprising:

skipping, for each rank, processing of the first wait list for modification access at a regular interval based on the number of metadata track destages that have been performed.

7. The method of claim 3, wherein determining the count of modified metadata tracks further comprises:

decrementing the count when a metadata track on the rank is destaged from cache to storage; and incrementing the count when a metadata track on the rank is staged to cache.

8. The method of claim 3, further comprising:

determining that a first number of metadata tracks have been destaged for a given rank; and granting, for the given rank, modification access to a second number of metadata tracks on a wait list for modification access, the second number being less than the first number.

9. The method of claim 1, further comprising:

storing an identifier for each modified metadata track in non-volatile storage.

10. A system comprising:

a cluster complex having a first node and a second node, the first node having a first cache and the second node having a second cache;

a computing node comprising a computer readable storage medium having program instructions embodied therewith, the program instructions executable by a processor of the computing node to cause the processor to perform a method comprising:

receiving a request to load code at a cluster complex;

in response to the request:

destaging the first cache of the first node and detecting that the first cache has reached a state of zero modified data; and directing input/output requests to the second node;

in response to the first cache being destaged, sending the request to the first node;

executing the request at the first node; and resuming input/output requests to the first node.

11. The system of claim 10, wherein the processor is further configured to:

in response to resuming input/output requests to the first node:

destaging the second cache of the second node and detecting that the second cache has reached the state of zero modified data; and directing input/output requests to the first node;

in response to the second cache being destaged, sending the request to the second node;

executing the request at the second node; and resuming input/output requests to the second node.

12. The system of claim 10, further comprising:

one or more ranks communicatively coupled with the first node and the second node, the one or more ranks being an array of non-volatile storage, and wherein destaging the first cache further includes:

for each rank of the one or more ranks, determine a count of modified metadata tracks stored in one of the first cache;

loading a limit of modified metadata tracks per rank; and allocating a metadata track for modification access when the count of modified metadata tracks is less than the limit.

13. The system of claim 12, wherein determining the count of modified metadata tracks further comprises:

decrementing the count when a metadata track on the rank is destaged from cache to storage; and incrementing the count when a metadata track on the rank is staged to cache.

14. The system of claim 12, wherein the processor-executable instructions, when executed by the processor, further cause the processor to:

determining that a first number of metadata tracks have been destaged for a given rank; and granting, for the given rank, modification access to a second number of metadata tracks on a wait list for modification access, the second number being less than the first number.

15. The system of claim 12, wherein allocating the metadata track for modification access further comprises:

determining, before granting modification access for a metadata track of a rank of the one or more ranks, whether a number of modified metadata tracks on the rank is under the limit;

granting modification access for the metadata track if the number of modified metadata tracks on the rank is under the limit; and adding the metadata track to a wait list of the rank for modification access if the number of modified metadata tracks on the rank is not under the limit.

16. The system of claim 12, wherein the processor-executable instructions, when executed by the processor, further cause the processor to:

skip, for each rank, processing of a wait list for modification access at a regular interval based on the number of metadata track destages that have been performed.

17. The system of claim 10, wherein the processor-executable instructions, when executed by the processor, further cause the processor to:

store an identifier for each modified metadata track in non-volatile storage.

18. A computer program product for maintaining limits on modified metadata tracks, the computer program product comprising a computer readable storage medium having program instructions embodied therewith, the program instructions executable by a processor to cause the processor to perform a method comprising:

receiving a request to load code at a cluster complex, the cluster complex having a first node and a second node, the first node having a first cache and the second node having a second cache;

in response to the request:

destaging the first cache of the first node and detecting that the first cache has reached a state of zero modified data; and directing input/output requests to the second node;

in response to the first cache being destaged, sending the request to the first node;

executing the request at the first node; and resuming input/output requests to the first node.

19. The computer program product of claim 18, wherein the method further comprises:

in response to resuming input/output requests to the first node:

destaging the second cache of the second node and detecting that the second cache has reached the state of zero modified data; and directing input/output requests to the first node;

in response to the second cache being destaged, sending the request to the second node;

executing the request at the second node;

resuming input/output requests to the second node.

20. The computer program product of claim 18, wherein the method further comprises:

the first node and the second node being communicatively coupled with one or more ranks, the one or more ranks being an array of non-volatile storage, and wherein destaging the first cache further includes:

for each rank of the one or more ranks, determine a count of modified metadata tracks stored in one of the first cache;

loading a limit of modified metadata tracks per rank; and allocating a metadata track for modification access when the count of modified metadata tracks is less than the limit.

* * * * *